US012578518B2

(12) United States Patent
Kim et al.

(10) Patent No.: US 12,578,518 B2
(45) Date of Patent: Mar. 17, 2026

(54) COLOR CONTROL MEMBER AND DISPLAY DEVICE INCLUDING THE SAME

(71) Applicant: Samsung Display Co., Ltd., Yongin-si (KR)

(72) Inventors: Chansu Kim, Yongin-si (KR); Inok Kim, Yongin-si (KR); Keunchan Oh, Yongin-si (KR); Gak Seok Lee, Yongin-si (KR); Sanghun Lee, Yongin-si (KR); Soyun Lee, Yongin-si (KR); Jieun Jang, Yongin-si (KR); Chang-Soon Jang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 322 days.

(21) Appl. No.: 18/343,873

(22) Filed: Jun. 29, 2023

(65) Prior Publication Data

US 2024/0118466 A1 Apr. 11, 2024

(30) Foreign Application Priority Data

Sep. 23, 2022 (KR) ........................ 10-2022-0120877

(51) Int. Cl.
*G02B 5/20* (2006.01)

(52) U.S. Cl.
CPC .............. *G02B 5/206* (2013.01); *G02B 5/202* (2013.01); *G02B 2207/101* (2013.01)

(58) Field of Classification Search
CPC ........ G02B 5/20; G02B 6/0096; G02B 5/207; G02B 5/0205; G02B 5/206
USPC ........................................................ 359/885
See application file for complete search history.

(56) References Cited

U.S. PATENT DOCUMENTS

| | | | | |
|---|---|---|---|---|
| 10,181,281 | B2 | 1/2019 | Kim et al. | |
| 10,605,960 | B2 | 3/2020 | Kim et al. | |
| 11,500,239 | B2 | 11/2022 | Hwang et al. | |
| 11,917,883 | B2 * | 2/2024 | Jin | H10K 59/879 |
| 2020/0257022 | A1 * | 8/2020 | Byun | B32B 27/20 |
| 2020/0335571 | A1 * | 10/2020 | Kim | H10K 59/879 |
| 2021/0359011 | A1 * | 11/2021 | Lee | H10K 59/8792 |
| 2021/0399068 | A1 * | 12/2021 | Kim | H10K 59/8792 |

(Continued)

FOREIGN PATENT DOCUMENTS

| | | |
|---|---|---|
| KR | 10-2020-0040980 | 4/2020 |
| KR | 10-2282030 | 7/2021 |
| KR | 10-2294715 | 8/2021 |

*Primary Examiner* — Daniel St Cyr
(74) *Attorney, Agent, or Firm* — CANTOR COLBURN LLP

(57) ABSTRACT

A color control member includes a light control layer including quantum dots, a color filter layer disposed on the light control layer, and a low refractive layer disposed between the color filter layer and the light control layer. The low refractive layer includes a base resin, a plurality of non-hollow inorganic particles dispersed in the base resin and of which inner portions are filled. A weight percent of the base resin is in a range of about 40 wt % to about 45 wt % with respect to a total weight of the low refractive layer, and a weight percent of the non-hollow inorganic particles is in a range of about 40 wt % to about 45 wt % with respect to the total weight of the low refractive layer. The color control member including the low refractive layer has excellent reliability.

20 Claims, 8 Drawing Sheets

(56) References Cited

U.S. PATENT DOCUMENTS

| | | | | |
|---|---|---|---|---|
| 2023/0068622 A1* | 3/2023 | Seong | .................. | H10K 59/878 |
| 2023/0200176 A1* | 6/2023 | Lee | ........................ | H10H 20/84<br>257/40 |

* cited by examiner

COLOR CONTROL MEMBER AND DISPLAY DEVICE INCLUDING THE SAME

CROSS-REFERENCE TO RELATED APPLICATION(S)

This application claims priority to and benefits of Korean Patent Application No. 10-2022-0120877 under 35 U.S.C. § 119, filed on Sep. 23, 2022, the entire contents of which are incorporated hereby by reference.

BACKGROUND

1. Technical Field

Embodiments relate to a color control member including a low refractive layer and a display device including the color control member.

2. Description of the Related Art

Various display devices for providing image information in multimedia apparatuses such as televisions, mobile phones, tablet computers, navigation units, game consoles, and the like, have been developed. A display device including a liquid crystal display element, an organic light-emitting display element, and the like includes quantum dots to improve display quality.

For example, a low refractive layer is used to improve light efficiency of a display device including quantum dots. The low refractive layer includes hollow inorganic particles and the like, and moisture and gas are permeated into the hollow inorganic particles, thereby degrading reliability of the display device.

SUMMARY

Embodiments provide a color control member including a low refractive layer with improved reliability disposed between a light control layer and a color filter layer, and a display device including the color control member.

However, embodiments of the disclosure are not limited to those set forth herein. The above and other embodiments will become more apparent to one of ordinary skill in the art to which the disclosure pertains by referencing the detailed description of the disclosure given below.

In an embodiment, a color control member may include: a light control layer including quantum dots; a color filter layer disposed on the light control layer; and a low refractive layer disposed between the color filter layer and the light control layer, wherein the low refractive layer may include a base resin, a plurality of non-hollow inorganic particles which are dispersed in the base resin, wherein inner portions of the plurality of non-hollow inorganic particles are filled, and a void part formed from the porogen, a weight percent of the base resin may be in a range of about 40 wt % to about 45 wt % with respect to the total weight of the low refractive layer, and a weight percent of the plurality of non-hollow inorganic particles may be in a range of about 40 wt % to about 45 wt % with respect to the total weight of the low refractive layer.

In an embodiment, the low refractive layer may not include hollow inorganic particles of which inner portions are empty.

In an embodiment, the void part may have a spherical shape.

In an embodiment, each of the plurality of non-hollow inorganic particles may have a diameter in a range of about 10 nm to about 30 nm.

In an embodiment, the porogen may have a weight percent in a range of about 10 wt % to about 20 wt % with respect to the total weight of the low refractive layer.

In an embodiment, the porogen may be thermally decomposed to form the void part.

In an embodiment, the low refractive layer may have a refractive index in a range of about 1.21 to about 1.25.

In an embodiment, the low refractive layer may have a haze value in a range of less than about 0.40%.

In an embodiment, the base resin may include at least one of an acrylic resin, a silicone-based resin, an epoxy-based resin, a urethane-based resin, or an imide-based resin.

In an embodiment, the plurality of non-hollow inorganic particles may include at least one of $SiO_2$, $MgF_2$, or $Fe_3O_4$.

In an embodiment, the plurality of non-hollow inorganic particles may have a refractive index in a range of about 1.43 to about 1.46.

In an embodiment, a functional group of the base resin may be coupled to a surface of the plurality of non-hollow inorganic particles.

In an embodiment, a refractive index of the low refractive layer may be smaller than a refractive index of the light control layer.

In an embodiment, a display device includes: a display element layer, and a color control member disposed on the display element layer, wherein the color control member includes: a light control layer including quantum dots; a color filter layer disposed on the light control layer; and a low refractive layer disposed between the color filter layer and the light control layer, and the low refractive layer has a base resin, a plurality of non-hollow inorganic particles dispersed in the base resin, wherein inner portions of the plurality of non-hollow inorganic particles are filled, and a void part formed from the porogen, a weight percent of the base resin being in a range of about 40 wt % to about 45 wt % with respect to the total weight of the low refractive layer, and a weight percent of the plurality of non-hollow inorganic particles being in a range of about 40 wt % to about 45 wt % with respect to the total weight of the low refractive layer.

In an embodiment, the low refractive layer may not include hollow inorganic particles of which inner portions are empty.

In an embodiment, the low refractive layer may have a refractive index in a range of about 1.21 to about 1.25.

In an embodiment, each of the plurality of non-hollow inorganic particles may have a diameter in a range of about 10 nm to about 30 nm.

In an embodiment, the display element layer may include a light-emitting element configured to emit first light, the light control layer may include a first light control part including a first quantum dot that converts the first light into second light, a second light control part including a second quantum dot that converts the first light into third light, and a third light control part that transmits the first light.

In an embodiment, the color filter layer may include a first filter overlapping the first light control part, a second filter overlapping the second light control part, and a third filter overlapping the third light control part.

In an embodiment, the first light may be blue light, the first quantum dot may be configured to convert the blue light into red light, and the second quantum dot may be configured to convert the blue light into green light.

BRIEF DESCRIPTION OF THE DRAWINGS

The accompanying drawings are included to provide a further understanding of the invention, and are incorporated in and constitute a part of this specification. The drawings illustrate embodiments and, together with the description, serve to explain principles of the invention. In the drawings.

DETAILED DESCRIPTION OF THE EMBODIMENTS

Figure 1:
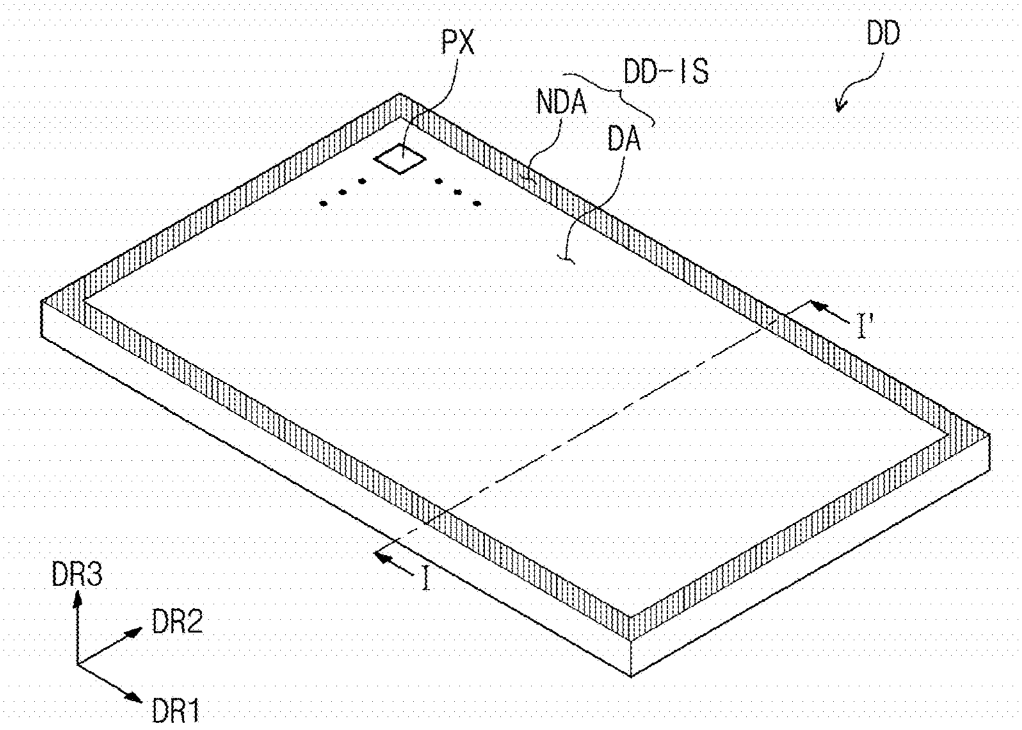
FIG. 1 is a schematic perspective view illustrating a display device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the X, Y, and Z-axes, and may be interpreted in a broader sense. For example, the DR1-axis, the DR2-axis, and the DR3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the"

are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Figure 2:
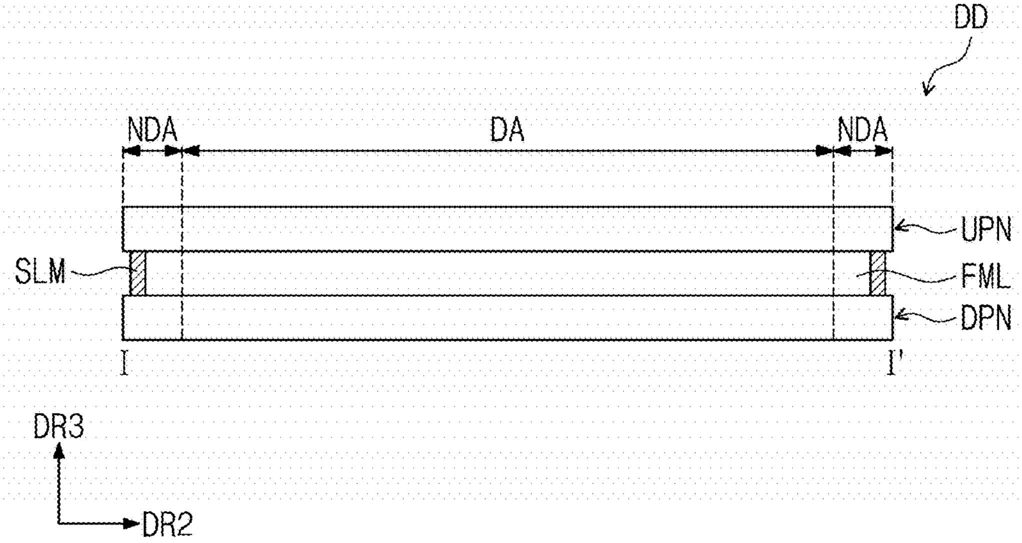
FIG. 2 is a schematic cross-sectional view taken along line I-I' of FIG. 1.

Hereinafter, a color control member and a display device including the same according to an embodiment will be described with reference to the drawings. FIG. 1 is a schematic perspective view illustrating a display device according to an embodiment. FIG. 2 is a schematic cross-sectional view taken along line I-I' of FIG. 1.

A display device DD according to an embodiment may be activated in response to an electrical signal. For example, the display device DD may be a television, an external billboard, a portable electronic device, a tablet PC, a car navigation unit, a game console, a personal computer, a laptop computer, or a wearable device, but embodiments are not limited thereto.

The display device DD may include a display surface DD-IS. A thickness direction of the display device DD may be parallel to a third direction axis DR3 that is a normal direction of a plane defined by the first direction axis DR1 and the second direction axis DR2. The directions indicated by the first to third direction axes DR1, DR2, and DR3 illustrated in the description may have a relative concept and may thus be changed to other directions. The directions indicated by the first to third direction axes DR1, DR2, and DR3 may be referred to as first to third directions, and may thus be denoted as the same reference numerals or symbols. In the description, a front surface (or upper surface) and a rear surface (or lower surface) of each member constituting the display device DD may be defined with respect to the third direction axis DR3. In the description, in the third direction axis DR3, a portion closer to the display surface DD-IS means an upper portion, and a portion away from the display surface DD-IS means a lower portion. In the description, the term, "plane" means a plane that is parallel to a plane defined by the first direction axis DR1 and the second direction axis DR2 and is perpendicular to the third direction axis DR3, and the term, "cross-section" means a surface parallel to the third direction axis DR3.

The display surface DD-IS may be parallel to a plane defined by a first direction axis DR1 and a second direction axis DR2. The display surface DD-IS may include a display region DA and a non-display region NDA. The display region DA may be a region in which an image (or video) is displayed. The non-display region NDA may be a region in which the image (or video) is not displayed. For example, pixels PX may be disposed in the display region DA, and wirings and a driving circuit for driving the pixels PX may be disposed in the non-display region NDA.

The non-display region NDA may be defined along an edge portion of the display surface DD-IS. The non-display region NDA may surround the display region DA. However, this is an example, and embodiments are not limited thereto. For example, the non-display region NDA may be omitted, or the non-display region NDA may be disposed on a single side of the display region DA.

Although FIG. 1 illustrates the display device DD having the flat display surface DD-IS, embodiments are not limited thereto. The display device DD may also include a curved display surface or a three-dimensional display surface. The three-dimensional display surface may include display regions indicating directions different from each other.

Referring to FIG. 2, the display device DD may include a lower panel DPN and an upper panel UPN disposed on the lower panel DPN. For example, the display device DD may include a filling layer FML and an encapsulation part SLM which are disposed between the lower panel DPN and the upper panel UPN.

The encapsulation part SLM may couple the lower panel DPN and the upper panel UPN. The encapsulation part SLM may be disposed in the non-display region NDA and may couple the lower panel DPN and the upper panel UPN. The encapsulation part SLM may be disposed in the non-display region NDA, which is an outer portion of the display device DD, and may prevent foreign substances, oxygen, moisture, and the like, from permeating into the display device DD from the outside. The encapsulation part SLM may be formed of a sealant including a curable resin. The sealant may include an epoxy-based resin, an acrylic resin, and the like. The sealant may be a thermosetting material or a photocurable material. In the description, a "~~based" resin may be considered as including a functional group of "~~".

The sealant may be disposed on a surface of the lower panel DPN or the upper panel UPN. For example, the lower panel DPN and the upper panel UPN may be attached (or coupled) to face each other, and the sealant may be cured by providing heat or ultraviolet light to form the encapsulation part SLM.

The filling layer FML may fill a space between the lower panel DPN and the upper panel UPN in the display region DA and the non-display region NDA. The filling layer FML may function as a buffer. In an embodiment, the filling layer FML may have a function of absorbing an impact, etc., and may increase the strength of the display device DD. The filling layer FML may be formed of a filling resin including a polymer resin. For example, the filling layer FML may be formed of a filling resin including an acrylic resin or an epoxy-based resin.

In another example, the filling layer FML and the encapsulation part SLM may be omitted. The upper panel UPN may be disposed (e.g., directly disposed) on the lower panel DPN without the filling layer FML and the encapsulation part SLM. In the description, "a component is disposed directly on another component" means that there is no third component is disposed between the component and the another component. In case that a component is 'directly disposed' on another component, it means that the component and the another component are in 'contact' with each other.

Figure 3:
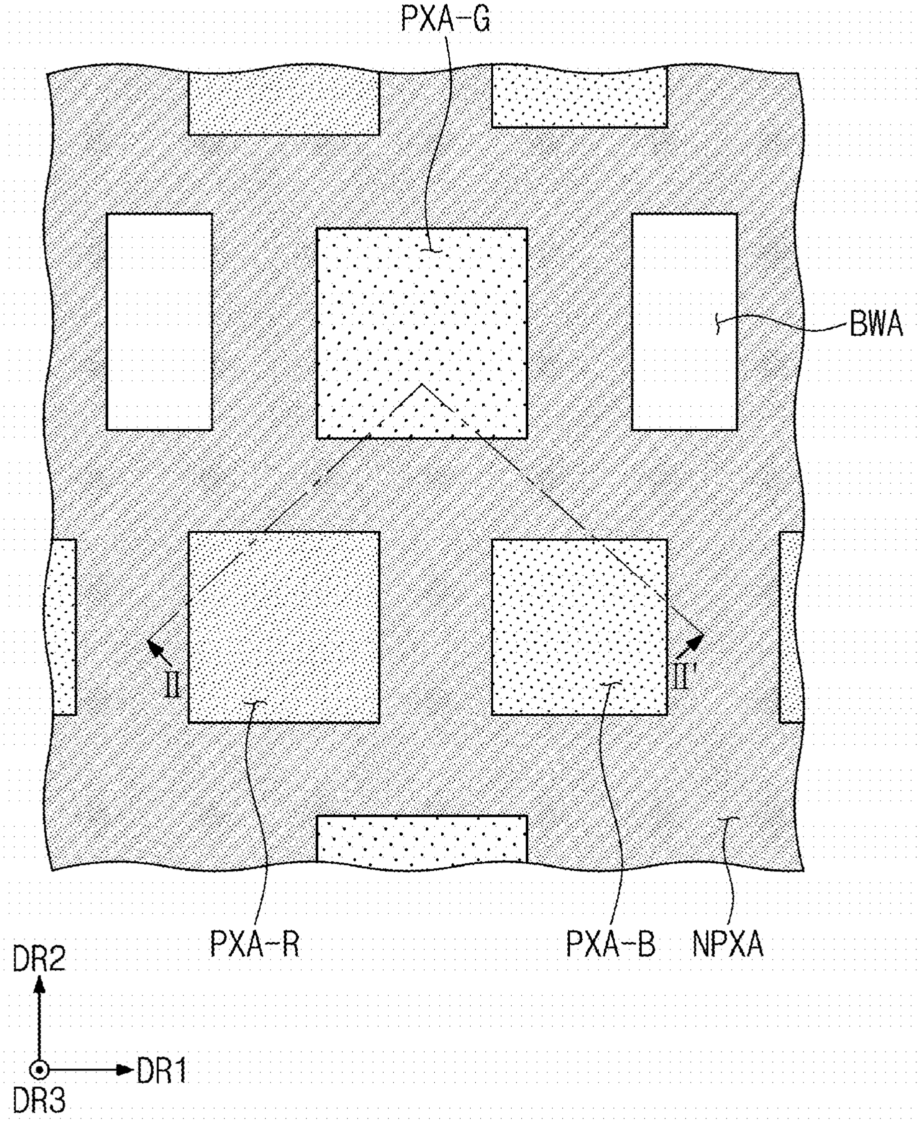
FIG. 3 is a schematic plan view illustrating a portion of a display device according to an embodiment.
Figure 4:
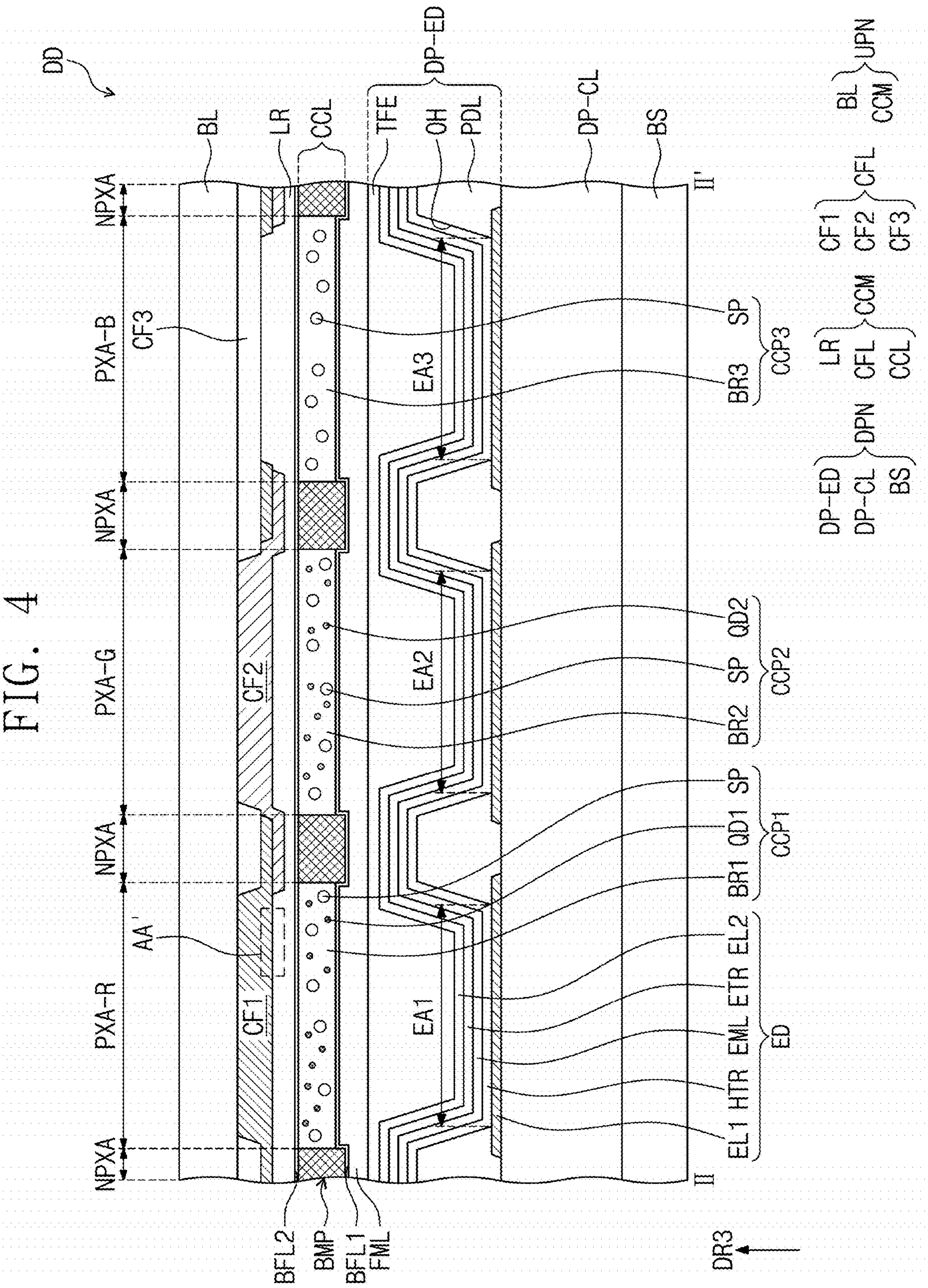
FIG. 4 is a schematic cross-sectional view taken along line II-II' of FIG. 3.

FIG. 3 is a schematic enlarged plan view of a portion of a display device DD according to an embodiment. FIG. 4 is a schematic cross-sectional view taken along line II-II' of FIG. 3.

FIG. 3 may be a schematic enlarged plan view of a portion of the display region DA in the display device DD. FIG. 3 illustrates a plane including three pixel regions PXA-R, PXA-B, and PXA-G and bank well regions BWA adjacent thereto. The three pixel regions PXA-R, PXA-B, and PXA-G illustrated in FIG. 3 may be repeatedly arranged throughout the display region DA (in FIG. 1).

A peripheral region NPXA may be disposed around the first to third pixel regions PXA-R, PXA-B, and PXA-G. The peripheral region NPXA may set boundaries between the first to third pixel regions PXA-R, PXA-B, and PXA-G. The peripheral region NPXA may surround the first to third pixel regions PXA-R, PXA-B, and PXA-G. A structure, such as a pixel defining film PDL (in FIG. 4) or a bank BMP (in FIG. 4), which prevents color mixing between the first to third pixel regions PXA-R, PXA-B, and PXA-G, may be disposed in the peripheral region NPXA.

Referring to FIG. 3, the first to third pixel regions PXA-R, PXA-B, and PXA-G have the same planar shape and have different planar areas, but embodiments are not limited thereto. At least two pixel regions among the first to third pixel regions PXA-R, PXA-B, and PXA-G may have the same area. The areas of the first to third pixel regions PXA-R, PXA-B, and PXA-G may be set according to the emitted color. The pixel region emitting green light among primary colors may have the largest area, and the pixel region emitting blue light may have the smallest area. In another example, the pixel region emitting red light among primary colors may have the largest area, and the pixel region emitting blue light may have the smallest area.

Referring to FIG. 3, each of the first to third pixel regions PXA-R, PXA-B, and PXA-G is illustrated to have a rectangular shape in a plan view. In another example, the first to third pixel regions PXA-R, PXA-B, and PXA-G may respectively have different polygonal shapes such as a rhombus or a pentagon. In another example, each of the first to third pixel regions PXA-R, PXA-B, and PXA-G may have a rectangular shape with rounded corners. For example, the first to third pixel regions PXA-R, PXA-B, and PXA-G may have different shapes on a plane.

FIG. 3 illustrates that the second pixel region PXA-G is disposed in a first row, and the first pixel region PXA-R and the third pixel region PXA-B are disposed in a second row. However, this is an example, and the arrangement of the first to third pixel regions PXA-R, PXA-B, and PXA-G may be variously changed. For example, the first to third pixel regions PXA-R, PXA-B, and PXA-G may be arranged in the same row.

One of the first to third pixel regions PXA-R, PXA-B, and PXA-G may emit first light, another one may emit second light different from the first light, and the other one may emit third light different from the first light and the second light. For example, the first pixel region PXA-R may emit red light, the second pixel region PXA-G may emit green light, and the third pixel region PXA-B may emit blue light.

The bank well regions BWA may be defined in the display region DA (in FIG. 1A). The bank well regions BWA may be regions formed to prevent defects due to erroneous deposition in the process of patterning light control parts CCP1, CCP2, and CCP3 included in the light control layer CCL (in FIG. 4). The bank well regions BWA may be obtained by partially removing the bank BMP (in FIG. 4). FIG. 3 illustrates that the two bank well regions BWA are defined to be adjacent to the second pixel regions PXA-G, but embodiments are not limited thereto, and the shape and arrangement of the bank well regions BWA may be variously changed.

Referring to FIG. 4, the lower panel DPN may include a base substrate BS, a circuit layer DP-CL disposed on the base substrate BS, and a display element layer DP-ED disposed on the circuit layer DP-CL. The upper panel UPN may include a color control member CCM and a base layer BL disposed on the color control member CCM.

The base substrate BS may be a member for providing a base surface on which the circuit layer DP-CL is disposed. The base substrate BS may include a single layer or multiple layers. For example, the base substrate BS may have a three-layer structure of a polymer resin layer, an adhesive layer, and a polymer resin layer. For example, the polymer resin layer may include a polyimide-based resin. For example, the polymer resin layer may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In the description, the polyimide-based resin means a resin including a functional group of polyimide. For example, this may be similarly applied to the description of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin.

The circuit layer DP-CL may include an insulating layer, a semiconductor pattern, a conductive pattern, a signal line, and the like. The circuit layer DP-CL may include transistors. Each of the transistors may include a control electrode, an input electrode, and an output electrode. For example, the circuit layer DP-CL may include a switching transistor and a driving transistor for driving the light-emitting element ED of the display element layer DP-ED.

The display element layer DP-ED may include an organic light-emitting element or a quantum dot light-emitting element. For example, the display element layer DP-ED may include an organic light-emitting material or quantum dots as a light-emitting material. For example, the display element layer DP-ED may include an ultra-small light-emitting element. For example, the ultra-small light-emitting element may include, for example, a micro LED element and/or nano LED element, etc. The micro light-emitting element may have a micro-scale size or a nano-scale size and may include an active layer disposed between semiconductor layers.

For example, a light-emitting element ED of the display element layer DP-ED may include a first electrode EL1, the second electrode EL2 facing the first electrode EL1, and a light-emitting layer EML disposed between the first electrode EL1 and the second electrode EL2. For example, the light-emitting element ED may include a hole transport region HTR disposed between the first electrode EL1 and the light-emitting layer EML, and an electron transport region ETR disposed between the light-emitting layer EML and the second electrode EL2.

The first electrode EL1 may be an anode or a cathode. For example, the first electrode EL1 may be a pixel electrode. The first electrode EL1 may be a transmissive electrode, a transflective electrode, or a reflective electrode. The second electrode EL2 may be a common electrode. The second electrode EL2 may be a cathode or an anode, but embodiments are not limited thereto. In case that the first electrode EL1 is an anode, the second electrode EL2 may be a cathode; and in case that the first electrode EL1 is a cathode, the second electrode EL2 may be an anode. The second electrode EL2 may be a transmissive electrode, a transflective electrode, or a reflective electrode.

For example, an element capping layer may be disposed on the second electrode EL2. The element capping layer may be a single layer or a multilayer. The element capping layer may include an alkali metal compound such as LiF, an alkaline earth metal compound such as $MgF_2$, and an inorganic material such as SiON, $SiN_x$, or $SiO_y$. In another example, the element capping layer may include α-NPD, NPB, TPD, m-MTDATA, $Alq_3$, CuPc, N4,N4,N4',N4'-tetra (biphenyl-4-yl) biphenyl-4,4'-diamine (TPD15), 4,4',4"-tris (carbazol sol-9-yl)triphenylamine (TCTA), and the like, or an organic material such as an epoxy resin or an acrylate such as a methacrylate.

The light-emitting layer EML may emit first light. For example, the light-emitting layer EML may generate blue light. The light-emitting layer EML may generate light in a wavelength range of about 410 nm to about 480 nm. Although FIG. 4 illustrates the light-emitting element ED including a light-emitting layer EML, the light-emitting element ED may include light-emitting layers. For example, the light-emitting element ED may have a tandem structure.

The hole transport region HTR may include a hole transport layer and may further include a hole injection layer and/or an electron blocking layer. The electron transport region ETR may include an electron transport layer and may further include an electron injection layer and/or a hole blocking layer.

FIG. 4 illustrates that the hole transport region HTR, the light-emitting layer EML, and the electron transport region ETR are formed as common layers, but embodiments are not limited thereto. For example, the hole transport region HTR, the light-emitting layer EML, and/or the electron transport region ETR may be patterned and formed in light-emitting opening OH defined in the pixel defining film PDL. In case that the light-emitting layer is patterned and formed in the light-emitting opening OH, the light-emitting layer in the first to third pixel regions PXA-R, PXA-B, and PXA-G may emit light in different wavelength ranges.

The display element layer DP-ED may include a pixel defining film PDL. The pixel defining film PDL may include a light absorbing material or may be formed of an organic light blocking material or an inorganic light blocking material which includes a black pigment or a black dye. The light-emitting opening OH of the pixel defining film PDL may expose at least a portion of the first electrode EL1. The first to third light-emitting regions EA1, EA2, and EA3 may be defined by the light-emitting opening OH.

The first light-emitting region EA1, the second light-emitting region EA2, and the third light-emitting region EA3 may be regions divided by the pixel defining film PDL. The first light-emitting region EA1, the second light-emitting region EA2, and the third light-emitting region EA3 may respectively correspond to (or overlap) the first pixel region PXA-R, the second pixel region PXA-G, and the third pixel region PXA-B. The first, second, and third light-emitting regions EA1, EA2, and EA3 may overlap the first, second, and third pixel regions PXA-R, PXA-G, and PXA-B and may not overlap the bank well regions BWA (in FIG. 3). In a plan view, the areas of the first, second, and third light-emitting regions EA1, EA2, and EA3 may be respectively smaller than the areas of the first, second, and third pixel regions PXA-R, PXA-G, and PXA-B. In the description, the term, "a component and another component corresponding to each other" is not limited to an element and another element having the same planar shape and the same planar area (or size), and also means the cases of having different shapes and/or different areas (or sizes).

The display element layer DP-ED may include an encapsulation layer TFE disposed on the second electrode EL2. The encapsulation layer TFE may include an organic material and/or an inorganic material. The encapsulation layer TFE may include at least one organic layer and at least one inorganic layer. For example, the encapsulation layer TFE may include a multilayer structure in which a first inorganic layer, an organic layer, and a second inorganic layer are sequentially stacked. The first inorganic layer and the second inorganic layer of the encapsulation layer TFE may protect the light-emitting element ED from external moisture and/or oxygen, and the organic layer of the encapsulation layer TFE may prevent dented defects of the light-emitting element ED caused by foreign substances permeated during the manufacturing process.

The base layer BL of the upper panel UPN may be a member that provides a base surface on which the color control member CCM is disposed. For example, the base layer BL may be a glass substrate, a metal substrate, a plastic substrate, or the like. However, embodiments are not limited thereto, and the base layer BL may be an inorganic layer, an organic layer, or a composite material layer. In another example, the base layer BL may be omitted in the display device DD according to an embodiment. For example, a functional layer such as an anti-reflective layer, an anti-fingerprint layer, and a hard coating layer may be further disposed on the base layer BL.

The color control member CCM according to an embodiment may include a light control layer CCL disposed on the display element layer DP-ED, a color filter layer CFL disposed on the light control layer CCL, and a low refractive layer LR disposed between the light control layer CCL and the color filter layer CFL. In an embodiment, the low refractive layer LR may include non-hollow inorganic particles AE (in FIG. 5) of which the inner portions are filled.

In an embodiment, the low refractive layer LR may not include hollow inorganic particles of which the inner portions are empty.

In the description, the non-hollow inorganic particles may be particles of which the inner portions are filled, e.g., particles of which the inner portions are not empty. In the hollow inorganic particles of which the inner portions are empty, moisture and/or gas may be permeated into the empty inner portions of the particles, and defects such as stains may occur in the color control member including the hollow inorganic particles. Compared to the hollow inorganic particles of which the inner portions are empty, the non-hollow inorganic particles AE (in FIG. 5), of which the inner portions are not empty, may be provided at a relatively low cost. Accordingly, in an embodiment, the color control member CCM including the low refractive layer LR including the non-hollow inorganic particles AE (in FIG. 5) may prevent the permeation of moisture and/or external gas, thereby improving reliability. For example, the manufacturing cost of the color control member CCM including the low refractive layer LR including the non-hollow inorganic particles AE (in FIG. 5) may be reduced. The low refractive layer LR will be described below in more detail with reference to FIG. 5.

The light control layer CCL may include the first to third light control parts CCP1, CCP2, and CCP3 and banks BMP. The first light control part CCP1 may be disposed to correspond to (or overlap) the first pixel region PXA-R, the second light control part CCP2 may be disposed to correspond to (or overlap) the second pixel region PXA-G, and the third light control part CCP3 may be disposed to correspond to (or overlap) the third pixel region PXA-B. The first to third light control parts CCP1, CCP2, and CCP3 may be spaced apart from each other. The banks BMP may be disposed between the light control parts CCP1, CCP2, and CCP3 spaced apart from each other. However, embodiments are not limited thereto, and at least some of the edge portions of the light control parts CCP1, CCP2, and CCP3 may overlap the banks BMP.

The bank BMP may include a base resin and an additive. The base resin may be formed of various resin compositions, which are generally referred to as a binder. The additive may include a coupling agent and/or a photoinitiator. The additive may further include a dispersant.

The bank BMP may include a black coloring agent to block light. The bank BMP may include a black dye and/or black pigment mixed with a base resin. The black coloring agent may include carbon black, a metal such as chromium, or an oxide thereof.

The first light control part CCP1 may include a first quantum dot QD1 that converts the first light emitted from the light-emitting element ED into the second light, and the second light control part CCP2 may include a second quantum dot QD2 that converts the first light into the third light. The third light control part CCP3 may transmit the first light. The first light control part CCP1 may provide red light that is second light, and the second light control part CCP2 may provide green light that is third light. The third light control part CCP3 may transmit blue light that is the first light emitted from the light-emitting element ED and provide the transmitted blue light. For example, the first quantum dot QD1 may be a red quantum dot, and the second quantum dot QD2 may be a green quantum dot.

The core of each of the first and second quantum dots QD1 and QD2 may be selected from the group consisting of a group II-VI compound, a group I-II-VI compound, a group II-IV-VI compound, a group I-II-IV-VI compound, a group III-VI compound, a group I-III-VI compound, a group III-V compound, a group III-II-V compound, a group II-IV-V compound, a group IV-VI compound, a group IV element, a group IV compound, and a combination thereof.

The group II-VI compound may be selected from the group consisting of: a binary compound selected from the group consisting of CdSe, CdTe, CdS, ZnS, ZnSe, ZnTe, ZnO, HgS, HgSe, HgTe, MgSe, MgS and a mixture thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and a mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe and a mixture thereof. For example, the group II-VI compound may further include the group I metal and/or the group IV element. The group I-II-VI compound may be selected from CuSnS or CuZnS, and the group II-IV-VI compound may be selected from ZnSnS or the like. The group I-II-IV-VI compound may be selected from a quaternary compound selected from the group consisting of $Cu_2ZnSnS_2$, $Cu_2ZnSnS_4$, $Cu_2ZnSnSe_4$, $Ag_2ZnSnS_2$ and a mixture thereof.

The group III-VI compound may include a binary compound such as $In_2S_3$ and $In_2Se_3$, a ternary compound such as $InGaS_3$ and $InGaSe_3$, or any combination thereof.

The group I-III-VI compound may be selected from a ternary compound selected from the group consisting of AgInS, $AgInS_2$, CuInS, $CuInS_2$, $AgGaS_2$, $CuGaS_2$ $CuGaO_2$, $AgGaO_2$, $AgAlO_2$ and a mixture thereof, or a quaternary compound such as $AgInGaS_2$ and $CuInGaS_2$.

The group III-V compound may be selected from the group consisting of: a binary compound selected from the group consisting of GaN, GaP, GaAs, GaSb, AlN, AlP, AlAs, AlSb, InN, InP, InAs, InSb, and a mixture thereof; a ternary compound selected from the group consisting of GaNP, GaNAs, GaNSb, GaPAs, GaPSb, AlNP, AlNAs, AlNSb, AlPAs, AlPSb, InGaP, InAlP, InNP, InNAs, InNSb, InPAs, InPSb and a mixture thereof; and a quaternary compound selected from the group consisting of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and a mixture thereof. For example, the group III-V compound may further include a group II metal. For example, InZnP or the like may be selected as the group III-II-V compound.

The group II-IV-V compound may be a ternary compound selected from the group consisting of ZnSnP, $ZnSnP_2$, $ZnSnAs_2$, $ZnGeP_2$, $ZnGeAs_2$, $CdSnP_2$, $CdGeP_2$ and a mixture thereof.

The group IV-VI compound may be selected from the group consisting of a binary compound selected from the group consisting of SnS, SnSe, SnTe, PbS, PbSe, PbTe and a mixture thereof, a ternary compound selected from the group consisting of SnSeS, SnSeTe, SnSTe, PbSeS, PbSeTe, PbSTe, SnPbS, SnPbSe, SnPbTe and a mixture thereof, and a quaternary compound selected from the group consisting of SnPbSSe, SnPbSeTe, SnPbSTe and a mixture thereof. The group IV element may be selected from the group consisting of Si, Ge, and a mixture thereof. The group IV compound may be a binary compound selected from the group consisting of SiC, SiGe, and a mixture thereof.

For example, the binary compound, the ternary compound, or the quaternary compound may be present in the particle with a uniform concentration, or may be present in the same particle with partially different concentration distributions. For example, the quantum dot may have a core/shell structure in which a quantum dot surrounds another quantum dot. The core/shell structure has a concentration gradient in which the concentration of elements present in the shell decreases toward the core.

In some embodiments, the first and second quantum dots QD1 and QD2 may each have a core-shell structure including a core having the above-described nanocrystals and a shell surrounding the core. The shell of the quantum dots may function as a protective layer for maintaining semiconductor characteristics by preventing chemical modification of the core and/or function as a charging layer for imparting electrophoretic characteristics to the quantum dot. The shell may be a single layer or multiple layers. Examples of the shell of the quantum dots may include a metal or non-metal oxide, a semiconductor compound, or a combination thereof.

For example, examples of the metal or non-metal oxide may include a binary compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, and NiO or a ternary compound such as $MgAl_2O_4$, $CoFe_2O_4$, $NiFe_2O_4$, and $CoMn_2O_4$, but embodiments are not limited thereto.

Examples of the semiconductor compound may include CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb and the like, but embodiments are not limited thereto.

The first and second quantum dots QD1 and QD2 may have a full width of half maximum (FWHM) of an emission wavelength spectrum in a range of about 45 nm or less, in a range of about 40 nm or less, and more, or in a range of about 30 nm or less. Thus, the color purity or the color reproducibility may be improved. For example, light emitted through such a quantum dot may be emitted in all directions, so that wide viewing angle characteristics may be improved.

For example, the shapes of the first and second quantum dots QD1 and QD2 are not limited to shapes commonly used in the field, but, more specifically, the quantum dots may have shapes such as a spherical shape, a pyramidal shape, a multi-arm shape, or a cubic nanoparticle, a nanotube, a nanowire, a nanofiber, and a nanoplatelet particle. The first and second quantum dots QD1 and QD2 may control the color of emitted light according to the particle size, and accordingly, the quantum dot may have various emission colors such as blue, red, and green.

For example, the light control layer CCL may further include a scatterer SP. The first light control part CCP1 may include a first quantum dot QD1 and the scatterer SP, and the second light control part CCP2 may include a second quantum dot QD2 and the scatterer SP. The third light control part CCP3 may not include any quantum dot and may include the scatterer SP.

The scatterer SP may be an inorganic particle. For example, the scatterer SP may include at least one of $TiO_2$, ZnO, $Al_2O_3$, $SiO_2$, or hollow silica. The scatterer SP may include any one among $TiO_2$, ZnO, $Al_2O_3$, $SiO_2$, and hollow silica, or may be a mixture of two or more materials selected from among $TiO_2$, ZnO, $Al_2O_3$, $SiO_2$, and hollow silica.

The first light control part CCP1, the second light control part CCP2, and the third light control part CCP3 may respectively include base resins BR1, BR2, and BR3 for dispersing the first and second quantum dots QD1 and QD2 and the scatterers SP. The first light control part CCP1 may include the first quantum dot QD1 and the scatterer SP dispersed in the first base resin BR1, and the second light control part CCP2 may include the second quantum dot QD2 and the scatterer SP dispersed in the second base resin BR2. The third light control part CCP3 may include the scatterer SP dispersed in the third base resin BR3.

The first, second, and third base resins BR1, BR2, and BR3 may be a medium in which the first and second quantum dots QD1 and QD2 and the scatters SP are dispersed, and may be formed of various resin compositions that are referred to as a binder. For example, the first, second, and third base resins BR1, BR2, and BR3 may each be an acrylic resin, a urethane-based resin, a silicone-based resin, or an epoxy-based resin. The first, second, and third base resins BR1, BR2, and BR3 may be transparent resins. In an embodiment, the first base resin BR1, the second base resin BR2, and the third base resin BR3 may be the same as or different from each other.

For example, a first barrier layer BFL1 may be disposed between the encapsulation layer TFE and the light control layer CCL. The first barrier layer BFL1 may function to prevent infiltration (or permeation) of moisture and/or oxygen. The first barrier layer BFL1 may block the light control parts CCP1, CCP2, and CCP3 from being exposed to moisture and/or oxygen. The first barrier layer BFL1 may cover the first to third light control parts CCP1, CCP2, and CCP3. A second barrier layer BFL2 may be disposed between the light control layer CCL and the low refractive layer LR. In another example, at least one of the first barrier layer BFL1 or the second barrier layer BFL2 may be omitted.

Each of the first and second barrier layers BFL1 and BFL2 may include at least one inorganic layer. For example, each of the first and second barrier layers BFL1 and BFL2 may include an inorganic material. For example, each of the first and second barrier layers BFL1 and BFL2 may include silicon nitride, aluminum nitride, zirconium nitride, titanium nitride, hafnium nitride, tantalum nitride, silicon oxide, aluminum oxide, titanium oxide, tin oxide, cerium oxide, and silicon oxynitride, or may include a metal foil with sufficient light transmittance. For example, each of the first and second barrier layers BFL1 and BFL2 may further include an organic film. Each of the first and second barrier layers BFL1 and BFL2 may be formed of a single layer or a plurality of layers.

The color filter layer CFL may include first to third filters CF1, $CF_2$, and CF3. The first to third filters CF1, $CF_2$, and CF3 may be disposed to respectively correspond to (or overlap) the first to third light control parts CCP1, CCP2, and CCP3 of the light control layer CCL. The first filter CF1 may transmit the second light, the second filter $CF_2$ may transmit the third light, and the third filter CF3 may transmit the first light. For example, the first filter CF1 may be a red filter, the second filter $CF_2$ may be a green filter, and the third filter CF3 may be a blue filter. The first to third filters CF1, $CF_2$, and CF3 may be disposed to respectively correspond to (or overlap) the first to third pixel regions PXA-R, PXA-B, and PXA-G.

Each of the first to third filters CF1, $CF_2$, and CF3 may include a polymer photosensitive resin and a pigment or a dye. The first filter CF1 may include a red pigment or a red dye, the second filter $CF_2$ may include a green pigment or a green dye, and the third filter CF3 may include a blue pigment or a blue dye. However, embodiments are not limited thereto, and the third filter CF3 may not include a pigment or a dye. The third filter CF3 may include a polymer photosensitive resin and may not include a pigment or a dye. The third filter CF3 may be transparent. The third filter CF3 may be formed of a transparent photosensitive resin.

For example, the first filter CF1 and the second filter $CF_2$ may be yellow filters. The first filter CF1 and the second filter $CF_2$ may not be separated from each other and may be integral with each other.

For example, the color filter layer CFL may further include a light blocking part. The light blocking part may be a black matrix. The light blocking part may be formed to include an inorganic or organic light blocking material including a black pigment or a black dye. The light blocking part may prevent a light leakage phenomenon and define boundaries between the adjacent filters CF1, $CF_2$, and CF3.

Figure 5:
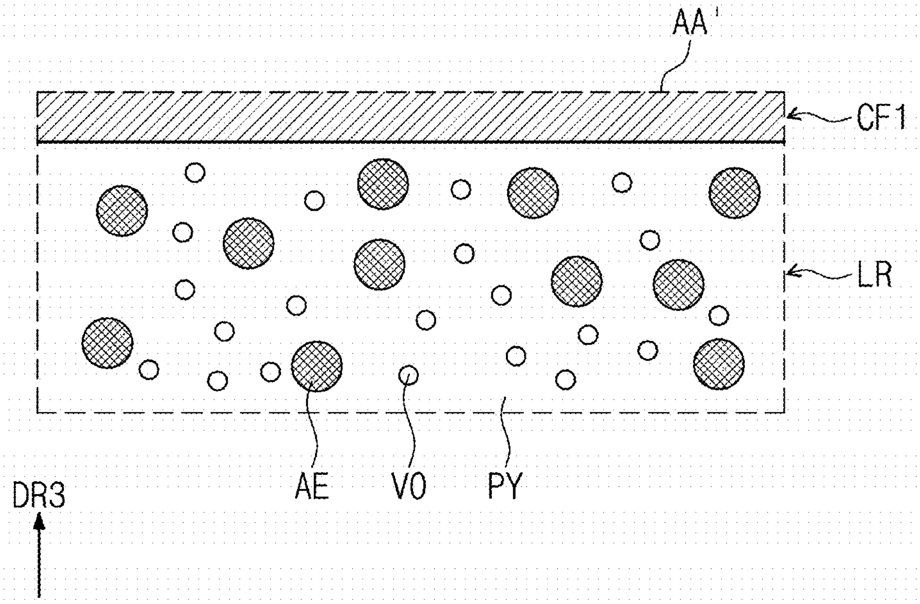
FIG. 5 is a schematic enlarged plan view illustrating a region AA' of FIG. 4.

FIG. 5 is a schematic enlarged plan view illustrating a region AA' of FIG. 4. Referring to FIG. 5, the low refractive layer LR may include a base resin PY, non-hollow inorganic particles AE dispersed in the base resin PY, and a void part VO. In an embodiment, the void part VO may be formed from porogen. The low refractive layer LR may be formed from a composition in which a polymer resin, non-hollow inorganic particles AE, and porogen are mixed. The base resin PY may be formed by solidifying the polymer resin of the composition, and the porogen may be thermally decomposed to form the void part VO. The void part VO formed from the porogen may have a spherical shape. The void part VO may be in a vacuum state or include a very small amount of gas. For example, an amorphous void part may be formed in a low refractive layer formed from a composition including a polymer resin and inorganic particles and not including porogen. The low refractive layer including the amorphous void part may have cracks occurring therein and may be lifted off from adjacent members (e.g., the light control layer and/or the color filter layer), thereby reducing processability and reliability.

For example, the low refractive layer LR may be formed by a slit coating process, a spin coating process, a roll coating process, a spray coating process, an inkjet printing process, or the like. However, this is an example, and a method of forming the low refractive layer LR is not limited thereto. The low refractive layer LR may be formed by various methods such as a transfer method.

A weight percent of the base resin PY may be in a range of about 40 wt % to about 45 wt % with respect to the total weight of the low refractive layer LR. The base resin PY may include at least one of an acrylic resin, a silicone-based resin, or an epoxy-based resin. For example, the base resin PY may include a silicone acrylate.

The low refractive layer LR including the base resin PY having a weight percent in a range of about 40 wt % to about 45 wt % may have excellent reliability. For example, the low refractive layer including the base resin having a weight percent of less than about 40 wt % may include relatively excessive weight percent of non-hollow inorganic particles and/or porogen, so that the haze value may be increased or durability may be decreased. The low refractive layer including the base resin having a weight percent of greater than about 45 wt % may include a relatively small weight percent of non-hollow inorganic particles and/or porogen, so that durability may be reduced or a refractive index range may not be satisfied.

The porogen may be a weight percent in a range of about 10 wt % to about 20 wt % with respect to the total weight of the low refractive layer LR. The low refractive layer LR including the void part VO formed from porogen having a weight percent in a range of about 10 wt % to about 20 wt % may satisfy the refractive index range of the low refractive layer LR according to an embodiment, and may have excellent durability. For example, the low refractive layer including the void part formed from porogen having a weight percent in a range of less than about 10 wt % may have a relatively high refractive index (e.g., a refractive index greater than about 1.25). Cracks may occur in the low refractive layer including the void part formed from the porogen having a weight percent in a range of more than about 20 wt %, so that durability may decrease.

The low refractive layer LR may have a smaller refractive index than an adjacent component. The refractive index of the low refractive layer LR may be smaller than that of the light control layer CCL. In an embodiment, the low refractive layer LR may have a refractive index of about 1.21 to about 1.25. The low refractive layer LR may reflect (e.g., totally reflect) a portion of blue light that is emitted from the light control layer CCL toward the color filter layer CFL and may re-reflected the portion of the blue light onto the light control layer CCL. The low refractive layer LR having a refractive index of about 1.21 to about 1.25 may have a characteristic that total reflection due to a difference in refractive index with the light control layer CCL readily occurs.

The blue light may be generated by the light-emitting element ED. A portion of the blue light may be re-reflected onto the first light control part CCP1 and/or the second light control part CCP2 which are included in the light control layer CCL. The first light control part CCP1 may convert the re-incident blue light into red light, and the second light control part CCP2 may convert the re-incident blue light into green light. The light efficiency of the display device DD may be improved through such recirculation of the light. In an embodiment, the display device DD including the low refractive layer LR having a refractive index of about 1.21 to about 1.25 may have excellent light efficiency.

The low refractive layer LR may have a haze value of less than about 0.40%. The low refractive layer LR having a haze value of less than about 0.40% may be optically transparent. Accordingly, the color control member CCM and the display device DD including the low refractive layer LR having a haze value of less than about 0.40% may have excellent light efficiency.

In an embodiment, the non-hollow inorganic particles AE may be the particles of which the inner portions are not empty, and the low refractive layer LR may not include hollow inorganic particles of which the inner portions are empty. The non-hollow inorganic particles AE may include at least one of $SiO_2$, $MgF_2$, or $Fe_3O_4$. For example, the non-hollow inorganic particles AE may include $SiO_2$.

The non-hollow inorganic particles AE may have a weight percent of about 40 wt % to about 45 wt % with respect to the total weight of the low refractive layer LR. In case that the weight percent of the non-hollow inorganic particles may be less than about 40 wt % with respect to the total weight of the low refractive layer, cracks occur in the low refractive layer. In case that the weight percent of the non-hollow inorganic particles may be greater than about 45 wt % with respect to the total weight of the low refractive layer, the haze value and refractive index value of the low refractive layer increase. According to an embodiment, however, the low refractive layer LR including non-hollow inorganic particles AE having a weight percent in a range of about 40 wt % to about 45 wt % may have excellent optical transparency and durability.

The non-hollow inorganic particles AE may have a refractive index of about 1.43 to about 1.46. The low refractive layer LR including the non-hollow inorganic particles AE having a refractive index of about 1.43 to about 1.46 may have a refractive index of about 1.21 to about 1.25. In an embodiment, the low refractive layer LR may have a refractive index of about 1.21 to about 1.25. For example, the low refractive layer including the non-hollow inorganic particles having a refractive index of greater than about 1.46 or less than about 1.43 may have a refractive index of greater than about 1.25 or less than about 1.21.

Each of the non-hollow inorganic particles AE may have a spherical shape. Each of the non-hollow inorganic particles AE may have a diameter of about 10 nm to about 30 nm. The low refractive layer LR including the non-hollow inorganic particles AE having a diameter of about 10 nm to about 30 nm may have an excellent hardness, an improved haze value, and an improved specular component excluded (SCE) reflectance. The SCE reflectance may be the removal ratio of specular light from the total reflected light, and as the SCE reflectance increases, the specular light decreases. Thus, the light may be scattered without being recirculated, leading to a decrease in light efficiency.

Compared to non-hollow inorganic particles having a diameter of greater than about 30 nm, the non-hollow inorganic particles AE having a diameter of about 30 nm or less may be uniformly dispersed in the low refractive layer LR. The uniformly dispersed non-hollow inorganic particles AE may have high uniformity, so that the surface roughness of the low refractive layer LR may be reduced. The low refractive layer LR with reduced surface roughness may have improved haze value and improved specular component excluded (SCE) reflectance. Accordingly, the display device DD and the color control member CCM including the low refractive layer LR including the non-hollow inorganic particles AE having a diameter of about 30 nm or less may have excellent light efficiency.

For example, in terms of process, the low refractive layer including the non-hollow inorganic particles having a diameter of less than about 10 nm may not be readily formed. In the low refractive layer including the non-hollow inorganic particles having a diameter of greater than about 30 nm, the uniformity of the non-hollow inorganic particles may be decreased and the surface roughness of the low refractive layer may be increased. Accordingly, the low refractive layer including the non-hollow inorganic particles having a diameter of greater than about 30 nm may have a high haze value, a high SCE reflectance, and a low intensity.

Figure 6:
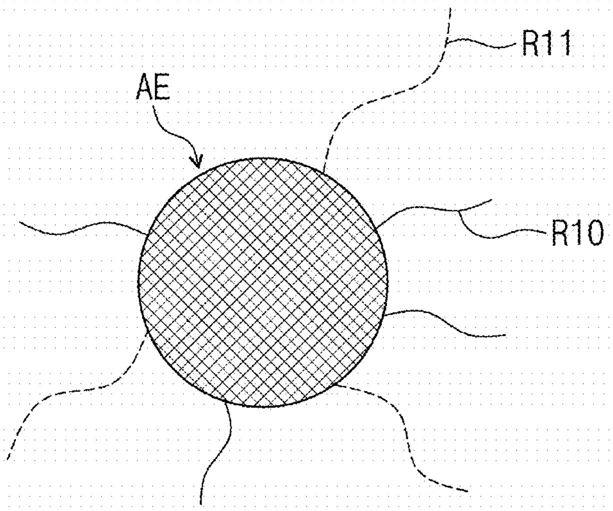
FIG. 6 illustrates a portion of a color control member according to an embodiment.

FIG. 6 illustrates a non-hollow inorganic particle AE according to an embodiment.

Referring to FIG. 6, the non-hollow inorganic particle AE may include a first functional group R10. The first functional group R10 may be bonded (or coupled) to the surface of the non-hollow inorganic particle AE. Referring to FIG. 6, three first functional groups R10 are illustrated, but the number of first functional groups R10 is not limited thereto.

The first functional group R10 of the non-hollow inorganic particle AE and a functional group of the base resin PY (in FIG. 5) may be bonded (or coupled). For example, the first functional group R10 may include a hydroxyl group, and the base resin PY may include an acryloyl group. A hydrogen atom in the hydroxyl group of the first functional group R10 may be removed and bonded (or coupled) to the acryloyl group of the base resin PY to form a second functional group R11 on the surface of the non-hollow inorganic particle AE. For example, the second functional group R11 may be represented by Formula 1 below.

[Formula 1]

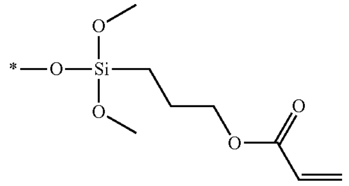

In Formula 1, "*—" is a position bonded (or coupled) to the surface of the non-hollow inorganic particle AE. With respect to the same volume, the surface area of the non-hollow inorganic particles AE having a diameter of about 30 nm or less may be greater than the surface area of the non-hollow inorganic particles having a diameter of greater than about 30 nm. With respect to the same volume of the low refractive layer, the non-hollow inorganic particles AE having a relatively small diameter may be provided much more than the non-hollow inorganic particles having a relatively large diameter so that the surface area of non-hollow inorganic particles AE may be increased. Since the surface area of the non-hollow inorganic particles AE is increased, bonding between the first functional group R10 of the non-hollow inorganic particle AE and the functional group of the base resin PY may be increased. Accordingly, the low refractive layer LR may have an improved haze value and excellent durability.

Hereinafter, with reference to Examples and Comparative Examples, the color control member and the display device including the same according to an embodiment will be described in detail. Examples below are illustrated to aid understanding of the invention, and the scope of the invention is not limited thereto.

Table 1 below shows the weight percents of a base resin, an inorganic particles, and porogen and the diameters of the inorganic particles in low refractive layers of Comparative Example 1 and Example 1. $SiO_2$ particles are used as inorganic particles. Comparative Example 1 includes hollow inorganic particles of which the inner portions are empty, and Example 1 includes non-hollow inorganic particles of which the inner portions are filled. Example 1 satisfies the weight percent ranges of the base resin, the inorganic particles, and the porogen according to an embodiment.

TABLE 1

| | Base Resin (wt %) | Inorganic Particles (wt %) | Porogen (wt %) | Particle Diameter (nm, hollow/ non-hollow) |
|---|---|---|---|---|
| Comparative Example 1 | 47 | 44 | 9 | 130 (hollow) |
| Example 1 | 42.5 | 42.5 | 15 | 20 (non-hollow) |

Referring to Table 1, it may be seen that the weight percent of the base resin in Example 1 satisfies a range of about 40 wt % to about 45 wt % with respect to the total weight of the low refractive layer. The range of about 40 wt % to about 45 wt % may be a weight percent range of the base resin according to an embodiment. It may be seen that the weight percent of the non-hollow inorganic particles in Example 1 satisfies a range of about 40 wt % to about 45 wt % with respect to the total weight of the low refractive layer. The range of about 40 wt % to about 45 wt % may be a weight percent range of the non-hollow inorganic particles according to an embodiment. It may be seen that in Example 1, a weight percent of the porogen satisfies a range of about 10 wt % to about 20 wt % with respect to the total weight of the low refractive layer. For example, it may be seen that the diameter of the non-hollow inorganic particles in Example 1 satisfies the range of about 10 nm to about 30 nm. The range of about 10 nm to about 30 nm may be a diameter range of the non-hollow inorganic particles according to an embodiment.

In Comparative Example 1, the weight percent of the base resin is greater than the weight percent of the base resin according to an embodiment, and the weight percent of the porogen is smaller than the weight percent of the porogen according to an embodiment. For example, the diameter of the hollow inorganic particles in Comparative Example 1 may be larger than the diameter of the non-hollow inorganic particles according to an embodiment.

Table 2 below shows the evaluation results of a viscosity, a solid content, a refractive index, a haze, an adhesive force, a surface roughness, and a reflectance of SCE in the low refractive layers of Comparative Example 1 and Example 1 of Table 1. The refractive index may be measured by using an instrument of M-2000V Elipsometer at a wavelength of about 550 nm, and the haze may be measured by using an instrument of NDH-2000(N) Nippon Denshoku Industries Co., Ltd. The surface roughness may be measured by using an instrument of NX20 Atomic Force Microscope manufactured by Park System Inc., and the reflectance of SCE may be measured by using an instrument of CM-2600D manufactured by Konica Minolta under a standard light source D65.

The smaller the value of surface roughness, the smoother the surface, and the larger the value of surface roughness, the rougher the surface. Adhesion may be evaluated in accordance with the standard of ASTM D3359, and the degree of damage was evaluated by cutting a sample. The sample may be cut by using an apparatus of YCC-230/1 manufactured by YOSHIMITSU. According to ASTM D3359, the adhesion evaluation criteria range from 0B to 5B, where 0B means that the degree of damage of the sample is about 65% or more, and 5B means the degree of damage is about 0%. For example, 4B means that the degree of damage to the sample is less than about 5%.

TABLE 2

| | Comparative Example 1 | Example 1 |
|---|---|---|
| Viscosity (cP) | 3.0 | 3.0 |
| Solid Content (%) | 12 | 13 |
| Refractive Index | 1.23 | 1.23 |
| Haze (%) | 0.48 | 0.39 |
| Adhesion | 5B | 5B |
| Surface Roughness | 10.61 | 2.36 |
| SCE Reflectance (%) | 0.44 | 0.40 |

Referring to Table 2, it may be seen that the low refractive layer of Comparative Example 1 including the hollow inorganic particles of which the inner portions are empty and the low refractive layer of Example 1 including the non-hollow inorganic particles, of which the inner portions are filled, have similar levels of viscosity, refractive index, and adhesion, and include a similar solid content. As the adhesive strength of the low refractive layer increases, bonding strength with an adjacent member (e.g., a light control part) may be improved.

The low refractive layer of Example 1 may include the void part formed from porogen, and may have a refractive index similar to that of the low refractive layer of Comparative Example 1 including hollow inorganic particles. As described above, the low refractive layer including the hollow inorganic particles may have low reliability since moisture and/or gas are permeated through the hollow. According to an embodiment, however, the low refractive layer including the non-hollow inorganic particles of which the inner portions are filled and the void part formed from the porogen may have excellent reliability with maintaining a refractive index.

Referring to Table 2, it may be seen that as compared to the low refractive layer of Comparative Example 1, the haze value, the surface roughness, and the SCE reflectance of the low refractive layer of Example 1 are improved. The low refractive layer of Example 1 may include the non-hollow inorganic particles of which the inner portions are filled and the void part formed from the porogen, and may include the non-hollow inorganic particles having a relatively small diameter. Accordingly, it is considered that the low refractive layer of Example 1 having excellent characteristics in terms of the haze value, the surface roughness, and the SCE reflectance.

The low refractive layer of Comparative Example 1 includes hollow inorganic particles having a relatively large diameter, and thus the uniformity of the hollow inorganic particles in the low refractive layer is low. Accordingly, it is considered that the low refractive layer of Comparative Example 1 has a high haze value, a high surface roughness, and a high SCE reflectance.

Figure 7A:
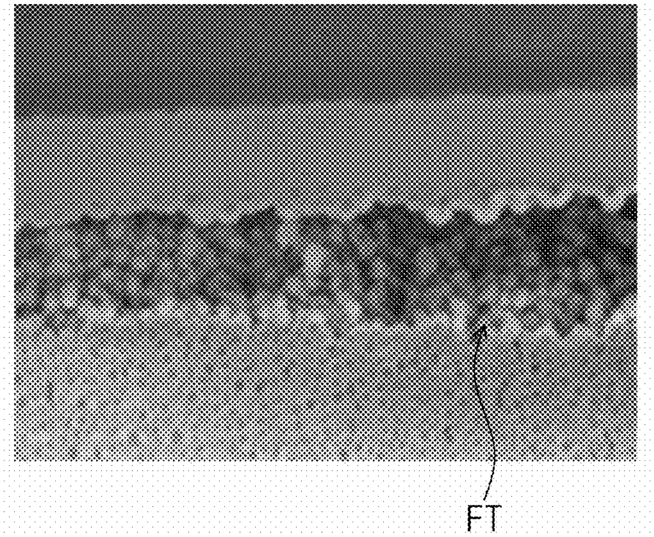
FIG. 7A is a microscopic image of a color control member according to Comparative Example.
Figure 7B:
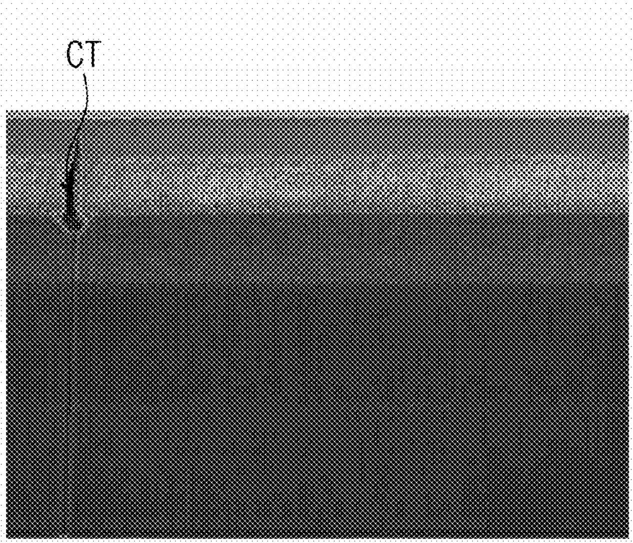
FIG. 7B is a microscopic image of a color control member according to Comparative Example.

FIGS. 7A and 7B are images obtained by photographing the low refractive layer of Comparative Example 2 with a scanning electron microscope (SEM). The low refractive layer of Comparative Example 2 does not include porogen, and is provided as a mixture in which inorganic particles and a polymer resin are mixed in a solvent, and evaporating the solvent to form a void part. Accordingly, in the low refractive layer of Comparative Example 2, the void part is formed in an amorphous form.

Referring to FIG. 7A, it may be seen that a lift FT occurs between the low refractive layer including the amorphous void part and a member adjacent to the low refractive layer. Referring to FIG. 7B, it may be seen that cracks CT occur in the low refractive layer including the amorphous void part. Accordingly, in an embodiment, the low refractive layer including a spherical void part formed from the porogen may have excellent reliability.

Figure 8:
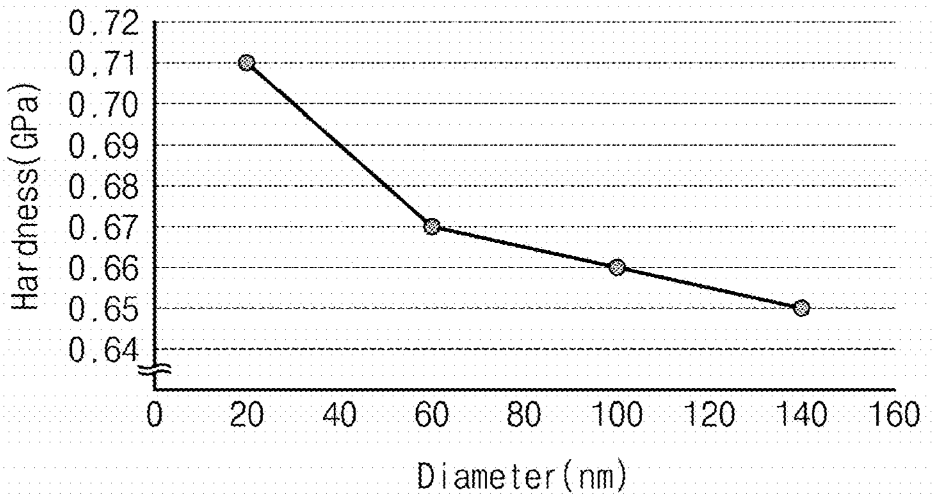
FIG. 8 is a graph showing the strength of a low refractive layer versus the diameter of non-hollow inorganic particles.

FIG. 8 is a graph showing the strength of a low refractive layer versus the diameter of non-hollow inorganic particles. Referring to FIG. 8, $SiO_2$ particles having a diameter of about 20 nm are used as the non-hollow inorganic particles. The strength may be measured by using an instrument of Nano-indenter manufactured by Anton Paar.

Referring to FIG. 8, it may be seen that as the diameter of the non-hollow inorganic particles is smaller, the low refractive layer may have more excellent strength. Accordingly, in an embodiment, it is considered that the low refractive layer including the non-hollow inorganic particles having a diameter of about 10 nm to about 30 nm will have excellent durability.

Figure 9:
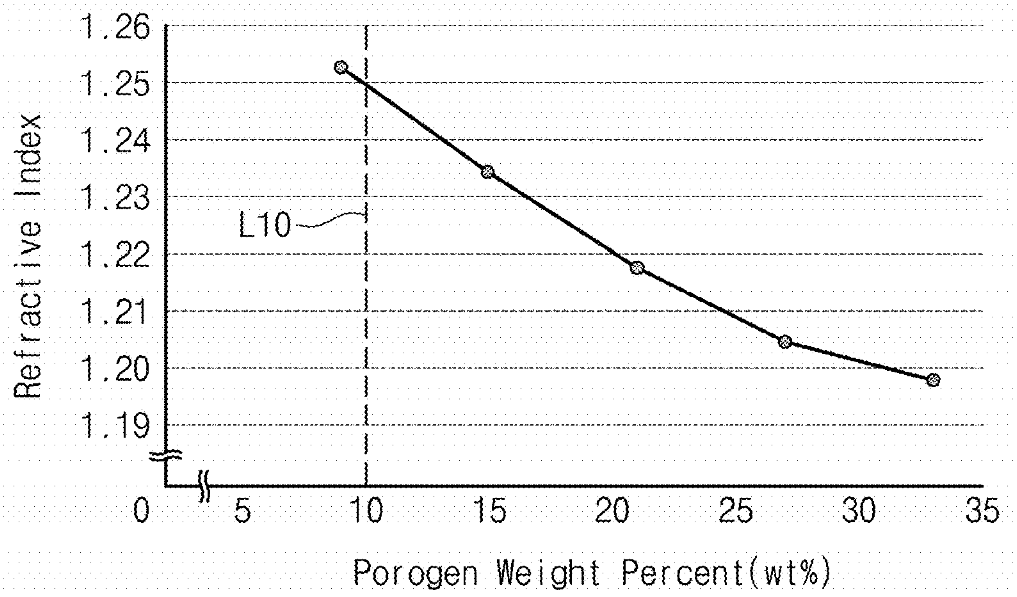
FIG. 9 is a graph showing the refractive index of a low refractive layer versus the weight percent of the porogen.

FIG. 9 is a graph showing the refractive index of the low refractive layer versus the weight percent of the porogen, and the refractive index is measured by using an instrument of M-2000V Elipsometer at a wavelength of about 550 nm. Referring to FIG. 9, a dotted line L10 parallel to the vertical axis indicating the refractive index indicates a point at which the weight percent of the porogen is about 10 wt %. In the graph of FIG. 9, with respect to the dotted line L10, the left-side region is a region in which the weight percent of the porogen is less than about 10 wt %, and the right-side region is a region in which the weight percent of the porogen is greater than about 10 wt %.

Referring to FIG. 9, it may be seen that the low refractive layer including the void part formed from the porogen having a weight percent in a range of about 10 wt % to about 20 wt % has a refractive index of about 1.21 to about 1.25. Accordingly, in an embodiment, the low refractive layer including the void part formed from the porogen having a weight percent in a range of about 10 wt % to about 20 wt % may have a refractive index of about 1.21 to about 1.25.

Referring to FIG. 9, the low refractive layer including the void part formed from the porogen having a weight percent in a range of of less than about 10 wt % may have a refractive index of greater than about 1.25. It is considered that since a relatively low weight percent of the porogen is provided, the void part formed from the porogen may be reduced, so that the low refractive layer may have a refractive index of greater than about 1.25. As described above, cracks may occur in the low refractive layer including the void part formed from the porogen having a weight percent in a range of greater than about 20 wt %, resulting in reduced durability.

Figure 10:
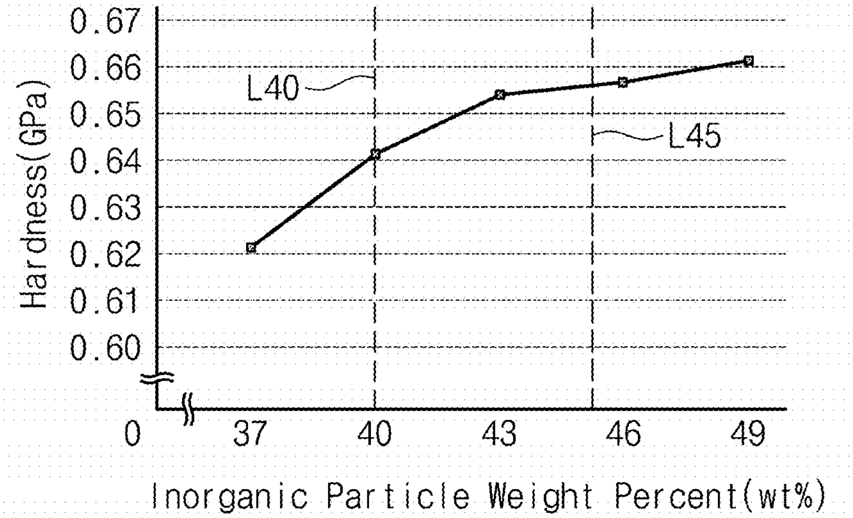
FIG. 10 is a graph showing the strength of a low refractive layer versus the weight percent of non-hollow inorganic particles.
Figure 11:
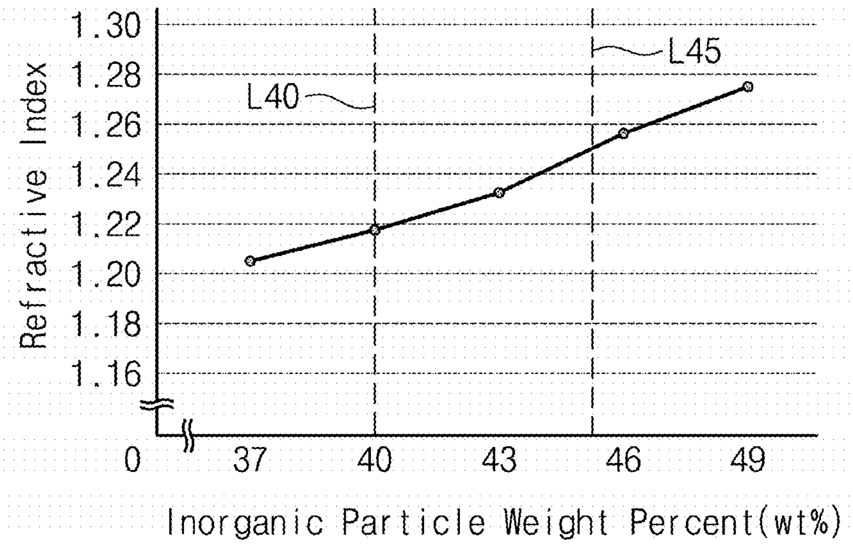
FIG. 11 is a graph showing the refractive index of a low refractive layer versus the weight percent of non-hollow inorganic particles.

FIGS. 10 and 11 are graphs showing the refractive index and the haze value of a low refractive layer versus the weight percent of non-hollow inorganic particles. Referring to FIGS. 10 and 11, $SiO_2$ particles having a diameter of about 20 nm are used as the non-hollow inorganic particles. The intensity may be measured by using an instrument of Nano-indenter manufactured by an Anton Paar, and the refractive index may be measured by using an instrument of M-2000V Elipsometer at a wavelength of about 550 nm. Referring to FIGS. 10 and 11, a dotted line L40 parallel to the vertical axis indicating the refractive index indicates a point where the weight percent of the non-hollow inorganic particles is about 40 wt %, and a dotted line L45 indicates the point where the weight percent of the non-hollow inorganic particles is about 45 wt %. In the graphs of FIGS. 10 and 11, the left-side region with respect to the dotted line L40 is a region in which the weight percent of the non-hollow inorganic particles is less than about 40 wt %, and the right-side region with respect to the dotted line L45 is a region in which the weight percent of the non-hollow inorganic particles is greater than about 45 wt %.

Referring to FIG. 10, it may be seen that the low refractive layer in which the weight percent of the non-hollow inorganic particles is about 40 wt % or more may have excellent strength. Referring to FIG. 11, it may be seen that the low refractive layer including the non-hollow inorganic particles having a weight percent in a range of about 40 wt % to about 45 wt % may have a refractive index of about 1.21 to about 1.25. In an embodiment, the non-hollow inorganic particles may have a weight percent in a range of about 40 wt % to about 45 wt %, and the low refractive layer may have a refractive index in a range of about 1.21 to about 1.25. For example, it may be seen that in case that the non-hollow inorganic particles have a weight percent of greater than about 45 wt %, the low refractive layer has a refractive index of greater than about 1.25.

Figure 12:
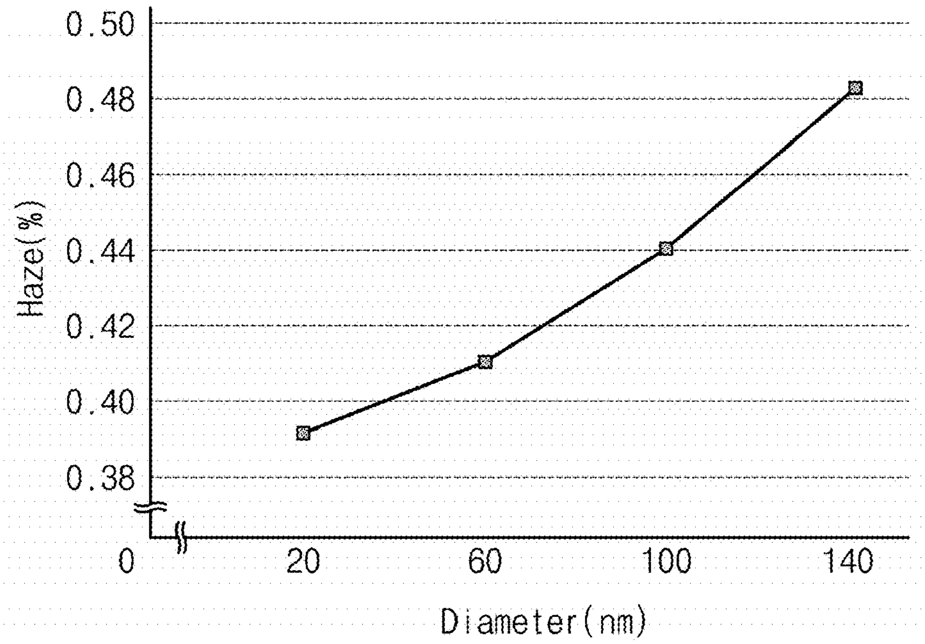
FIG. 12 is a graph showing the haze value of a low refractive layer versus the diameter of non-hollow inorganic particles.
Figure 13:
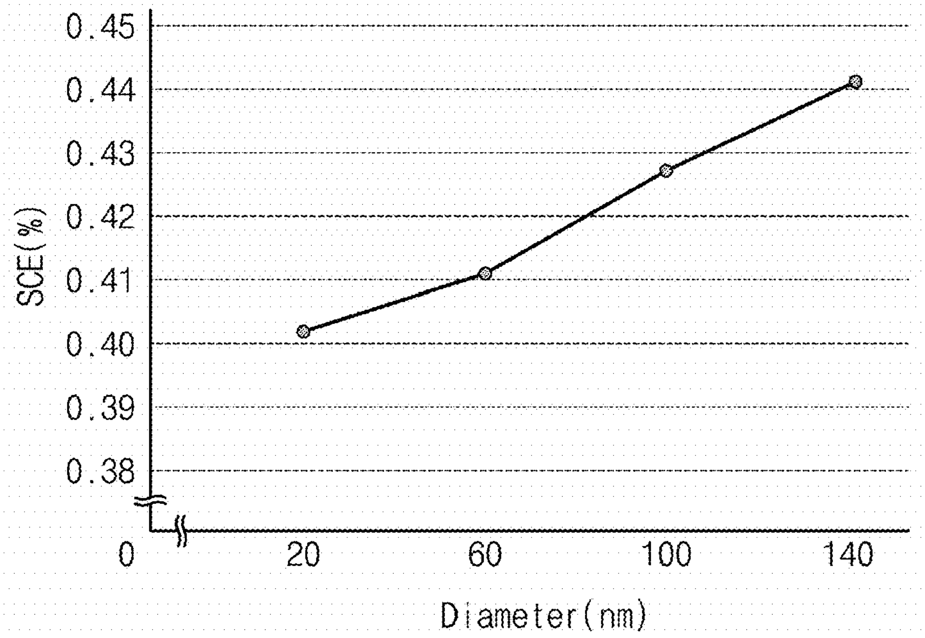
FIG. 13 is a graph showing the SCE reflectance of a low refractive layer versus the diameter of non-hollow inorganic particles.

FIGS. 12 and 13 are graphs showing the haze value and the SCE reflectance of a low refractive layer versus the diameter of non-hollow inorganic particles. In the low refractive layer of FIGS. 12 and 13, $SiO_2$ particles having a diameter of about 20 nm are used as the non-hollow inorganic particles. For example, in the low refractive layer of FIGS. 12 and 13, the base resin may have a weight percent in a range of about 42.5 wt %, the non-hollow inorganic particles may have a weight percent of about 42.5 wt %, and the porogen may have a weight percent of about 15 wt %.

Referring to FIG. 12, it may be seen that the haze value of the low refractive layer becomes higher as the diameter of the non-hollow inorganic particles is greater. It may be seen that the low refractive layer having a diameter of about 10 nm to about 30 nm of the non-hollow inorganic particles has a haze value of less than about 0.40%. Referring to FIG. 13, it may be seen that the SCE reflectance of the low refractive layer becomes higher as the diameter of the non-hollow inorganic particles is greater. It may be seen that the low refractive layer having a diameter of about 10 nm to about 30 nm of the non-hollow inorganic particles may have a relatively small SCE reflectance. Accordingly, in an embodiment, the low refractive layer including the non-hollow inorganic particles having a diameter of about 10 nm to about 30 nm may have improved haze value and SCE reflectance.

A display device according to an embodiment may include a display element layer and a color control member disposed on the display element layer. The color control member may include a light control layer including quantum dots, a color filter layer disposed on the light control layer, and a low refractive layer disposed between the light control layer and the color filter layer. The low refractive layer may include a base resin, non-hollow inorganic particles dispersed in the base resin, and a void part formed from porogen. The inner portions of the non-hollow inorganic particles may be filled. A weight percent of the non-hollow inorganic particles may be in a range of about 40 wt % to about 45 wt % with respect to the total weight of the low refractive layer. The low refractive layer including the non-hollow inorganic particles of which the inner portions are filled may satisfy a refractive index range and have excellent reliability. For example, the low refractive layer including the void part formed from the porogen may be prevented from being lifted, cracked, and the like, thereby having excellent processability.

A color control member and a display device including the same according to an embodiment may include a low refractive layer including non-hollow inorganic particles of which the inner portions are filled and a void part formed from porogen, and may have excellent reliability.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A color control member comprising:
- a light control layer including quantum dots;
- a color filter layer disposed on the light control layer; and
- a low refractive layer disposed between the color filter layer and the light control layer, wherein
- the low refractive layer includes:
  - a base resin,
  - a plurality of non-hollow inorganic particles dispersed in the base resin, wherein inner portions of the plurality of non-hollow inorganic particles are filled, and
  - a void part formed from porogen,
- a weight percent of the base resin is in a range of about 40 wt % to about 45 wt % with respect to a total weight of the low refractive layer, and a weight percent of the plurality of non-hollow inorganic particles is in a range of about 40 wt % to about 45 wt % with respect to the total weight of the low refractive layer.

2. The color control member of claim 1, wherein the low refractive layer does not comprise hollow inorganic particles of which inner portions are empty.

3. The color control member of claim 1, wherein the void part has a spherical shape.

4. The color control member of claim 1, wherein each of the plurality of non-hollow inorganic particles has a diameter in a range of about 10 nm to about 30 nm.

5. The color control member of claim 1, wherein the porogen has a weight percent in a range of about 10 wt % to about 20 wt % with respect to the total weight of the low refractive layer; and wherein the porogen is thermally decomposed to form the void part.

6. The color control member of claim 1, wherein the low refractive layer has a refractive index in a range of about 1.21 to about 1.25.

7. The color control member of claim 1, wherein the low refractive layer has a haze value in a range of less than about 0.40%.

8. The color control member of claim 1, wherein the base resin comprises at least one of an acrylic resin, a silicone-based resin, an epoxy-based resin, a urethane-based resin, or an imide-based resin.

9. The color control member of claim 1, wherein the plurality of non-hollow inorganic particles comprise at least one of $SiO_2$, $MgF_2$, or $Fe_3O_4$.

10. The color control member of claim 1, wherein the plurality of non-hollow inorganic particles have a refractive index in a range of about 1.43 to about 1.46.

11. The color control member of claim 1, wherein a functional group of the base resin is coupled to a surface of the plurality of non-hollow inorganic particles.

12. The color control member of claim 1, wherein a refractive index of the low refractive layer is smaller than a refractive index of the light control layer.

13. A display device comprising:

a display element layer, and a color control member disposed on the display element layer, wherein the color control member includes:

a light control layer including quantum dots;

a color filter layer disposed on the light control layer; and a low refractive layer disposed between the color filter layer and the light control layer, the low refractive layer includes:

a base resin, a plurality of non-hollow inorganic particles dispersed in the base resin, wherein inner portions of the plurality of non-hollow inorganic particles are filled, and a void part formed from porogen, a weight percent of the base resin is in a range of about 40 wt % to about 45 wt % with respect to a total weight of the low refractive layer, and a weight percent of the plurality of non-hollow inorganic particles is in a range of about 40 wt % to about 45 wt % with respect to the total weight of the low refractive layer.

14. The display device of claim 13, wherein the low refractive layer does not comprise hollow inorganic particles of which inner portions are empty.

15. The display device of claim 13, wherein the low refractive layer has a refractive index in a range of about 1.21 to about 1.25.

16. The display device of claim 13, wherein each of the plurality of non-hollow inorganic particles has a diameter in a range of about 10 nm to about 30 nm.

17. The display device of claim 13, wherein the display element layer comprises a light-emitting element configured to emit first light, and the light control layer includes:

a first light control part including a first quantum dot that converts the first light into second light, a second light control part including a second quantum dot that converts the first light into third light, and a third light control part that transmits the first light.

18. The display device of claim 17, wherein the color filter layer comprises:

a first filter overlapping the first light control part, a second filter overlapping the second light control part, and a third filter overlapping the third light control part.

19. The display device of claim 17, wherein the first light is blue light, the first quantum dot is configured to convert the blue light into red light, and the second quantum dot is configured to convert the blue light into green light.

20. The display device of claim 13, wherein the display device is a television, an external billboard, a portable electronic device, a tablet PC, a car navigation unit, a game console, a personal computer, a laptop computer, or a wearable device.

* * * * *